Patented June 12, 1951

2,556,260

UNITED STATES PATENT OFFICE 2,556,260

PROCESS FOR COAGULATING POLYMER EMULSIONS AND RECOVERING SPHERICAL PARTICLES

John Downing, Spondon, near Derby, England, assignor to Celanese Corporation of America, a corporation of Delaware No Drawing. Application July 29, 1947, Serial No. 764,595. In Great Britain August 12, 1946

6 Claims. (Cl. 260—92.8)

This invention relates to polymers, and in particular to the recovery of water-insoluble synthetic polymers, especially vinyl polymers, from aqueous emulsions of said polymers.

The principal object of the invention is to obtain polymers of the kind referred to above in a granular form in which the particles, or at least the major proportion of the particles, are substantially spherical, in which most of the particles fall within a relatively narrow range of particle size, and the dispersion of particle size is moderately uniform. A method directed to obtaining this result by carrying out polymerisation in aqueous suspension in the absence of a dispersing agent but in the presence of a protective colloid, e. g. bentonite, has been described (see, for example, W. P. Hohenstein and H. Mark, Journal of Polymer Science, vol. 1, pages 127–145). The method in question, however, is subject to certain difficulties and disadvantages, some of which are referred to in the article cited. In particular, there is a tendency as polymerisation progresses for the globules of polymer or monomer to stick together, with the result that a more or less coherent mass is obtained instead of the desired particulate form. Various expedients may be adopted to limit this cohesion, but each of these has its disadvantages. Thus, for instance, if a large amount of bentonite or other protective colloid be used the difficulty of removing this material from the polymer is increased. (To remove bentonite from the polymer involves an acid wash which may result in decreased heat stability due to the retention of traces of acid.) The addition of a salt to the aqueous phase to increase the surface tension introduces the further problem of subsequently removing the salt from the polymer. The introduction of a polyhydroxy alcohol into the aqueous phase to increase its viscosity tends to increase the solubility of the monomer in this phase.

According to the present invention the polymer is precipitated in the form of substantially spherical particles in a water-soluble liquid which is a non-solvent for the polymer by spraying the emulsion into said liquid, and said particles are removed from said liquid by filtration.

The spraying can be effected by causing the latex to flow through small orifices at a speed such that the streams of latex are broken up into droplets. Preferably, however, the latex is atomised in an air stream, for example by squirting it from nozzles in which jets of air impinge on a jet of the latex. In this way clear spherical grains of polymer showing a narrow range of size-distribution have been obtained.

The water-soluble liquid used as the coagulant is preferably an alcohol containing not more than 3 carbon atoms, for example methanol, ethanol or isopropanol. Alcohols which are not completely miscible with water at ordinary temperatures but have a substantial water-solubility at higher temperatures e. g. primary, secondary or tertiary butanol or normal, can be used at such higher temperatures. For example octanol can be employed at temperatures of 100–150° C. Water-soluble ketones, e. g. acetone and methyl ethyl ketone, and cyclic ethers, e. g. dioxane, can be used in connection with polymers which are not dissolved or swollen by these liquids.

The following example illustrates the invention:

Example

By polymerisation of vinyl chloride in aqueous emulsion, using as the emulsifying agent sodium secondary octadecyl sulphate containing small proportions of the octadecyl alcohol and sodium sulphate, and as the catalyst potassium persulphate, a latex containing 25% by weight of polyvinyl chloride is obtained. Preferably the emulsion is buffered to about pH 9 and stabilised with a small quantity of a protective colloid such as starch. Polymerisation may be accelerated by the use of a redox catalyst system or of a heavy metal complex activator. The latex is sprayed through atomiser nozzles in which jets of air impinge on a jet of the emulsion, under an air pressure of about 70 lbs. per square inch into a bath of industrial alcohol. In this way the polymer is precipitated in the form of particles which are for the most part spherical or spheroidal and most of which are of diameter within the range $10\mu$ to $50\mu$. The polymer is recovered from the bath by filtration and dried at 80° C. The bath can be used repeatedly for coagulation until the concentration of water and emulsifying agent becomes too high, after which the major part of the alcohol is distilled off and the aqueous solution of emulsifying agent used in carrying out further polymerisations. Other anionic emulsifying agents e. g. sodium stearate can be used in the same proportions instead of the octadecyl sulphate.

In a similar way, other water-insoluble addition-polymers for which suitable water-soluble non-solvents can be found, can be obtained in the desired granular form. Such polymers include polymers of vinylidene chloride, styrene, acrylonitrile, methacrylonitrile, ethyl acrylate and methyl methacrylate and other acrylates and methacrylates, vinyl esters, and copolymers of any of these monomers with one another or with vinyl chloride or with other mono-olefinic compounds, including compounds which do not polymerise alone, e. g. maleic anhydride and diethyl malonate. The process of the invention is of particular value in connection with polymers in which vinyl chloride, vinylidene chloride, or acrylonitrile units predominate, e. g. co-polymers of 80-95% vinyl chloride with vinyl acetate, of 80-95% vinylidene chloride with vinyl chloride, and of 50 to 60% acrylonitrile with vinyl chloride. The process of the invention is also applicable to the recovery from aqueous emulsion of synthetic water-insoluble polymers of butadiene and its derivatives, for example isoprene and chloroprene, and copolymers of such dienes with monovinyl compounds, for example copolymers of butadiene with styrene, acrylonitrile, or methyl methacrylate.

Having described my invention, what I desire to secure by Letters Patent is:

1. Process for recovering, in the form of substantially spherical particles, a water-insoluble synthetic polymer from an aqueous emulsion of the latter, which comprises converting the emulsion into droplets by means of an air stream impinging on a jet of the emulsion, forwarding said droplets into a body of a water-soluble liquid which is a non-solvent for the polymer, and filtering off the resulting particles of the polymer from the liquid.

2. Process according to claim 1, wherein the polymer is a polymer of vinyl chloride.

3. Process according to claim 1, wherein the polymer is a homo-polymer of vinyl chloride.

4. Process according to claim 1, wherein the polymer is a copolymer in which vinyl chloride units predominate.

5. Process for recovering, in the form of substantially spherical particles, polymerized vinyl chloride from an aqueous emulsion of the latter, which comprises converting the emulsion into droplets by means of an air stream impinging on a jet of the emulsion, forwarding said droplets into a body of water soluble alcohol containing from 1 to 3 carbon atoms and which is a non-solvent for the polymer and filtering off the resulting particles of polymerized vinyl chloride from the alcohol.

6. Process for preparing polyvinyl chloride in the form of substantially spherical particles, which comprises converting into droplets an aqueous emulsion containing about 25% by weight of polyvinyl chloride and an anionic emulsifying agent, said conversion being effected by means of an air stream impinging on a jet of the emulsion, forwarding said droplets into a body of ethanol, and filtering off the resulting particles of polyvinyl chloride from the ethanol.

JOHN DOWNING.

REFERENCES CITED

The following references are of record in the file of this patent:

UNITED STATES PATENTS

| Number | Name | Date |
| --- | --- | --- |
| 2,056,406 | Mayne | Oct. 6, 1936 |
| 2,366,460 | Semon | Jan. 2, 1945 |
| 2,404,817 | Strain | July 30, 1946 |
| 2,414,934 | Denny | Jan. 28, 1947 |

FOREIGN PATENTS

| Number | Country | Date |
| --- | --- | --- |
| 498,396 | Great Britain | Jan. 6, 1939 |